United States Patent [19]
Ueda

[11] Patent Number: 5,868,043
[45] Date of Patent: Feb. 9, 1999

[54] BICYCLE PEDAL

[75] Inventor: Yutaka Ueda, Tondabayashi, Japan

[73] Assignee: Shimano, Inc., Osaka, Japan

[21] Appl. No.: 896,308

[22] Filed: Jun. 28, 1997

[51] Int. Cl.$^6$ ........................................................ B62M 3/08
[52] U.S. Cl. ................................................................ 74/594.6
[58] Field of Search ............................... 74/594.6, 594.4; 36/131

[56] References Cited

U.S. PATENT DOCUMENTS

| | | | |
|---|---|---|---|
| 4,928,549 | 5/1990 | Nagano | 74/594.6 |
| 5,685,202 | 11/1997 | Chen | 74/594.6 |
| 5,697,262 | 12/1997 | Chen | 74/594.6 |

FOREIGN PATENT DOCUMENTS

| | | | |
|---|---|---|---|
| 3833790 | 4/1990 | Germany | 74/594.6 |

*Primary Examiner*—Charles A. Marmor
*Assistant Examiner*—Mary Ann Battista
*Attorney, Agent, or Firm*—James A. Deland

[57] ABSTRACT

A cleat clamping mechanism includes a base member, a first cleat clamping component movably coupled to the base member, and a second cleat clamping component coupled to the base member and spaced apart from the first cleat clamping component. The first cleat clamping component moves relative to the base member in response to a first force applied in a first direction, and the first cleat clamping component moves relative to the base member in response to a second force applied in a second direction that is different from the first direction. A resistance mechanism applies a particular resistive force to movement of the first cleat clamping component when the first cleat clamping component moves in response to the first force, but the resistance mechanism applies a different resistive force to movement of the first cleat clamping component when the first cleat clamping component moves in response to the second force.

18 Claims, 3 Drawing Sheets

BICYCLE PEDAL

BACKGROUND OF THE INVENTION

The present invention is directed to bicycle pedals with cleat clamping mechanisms and, more particularly, to a bicycle pedal having a cleat clamping mechanism which has different clamping forces for engaging and disengaging the cleat.

U.S. Pat. No. 4,928,549 shows a conventional bicycle pedal with a cleat clamping mechanism for engaging a cleat attached to a sole of a bicycling shoe. The pedal includes a horizontally-oriented U-shaped front clamping member disposed on the front of the pedal for engaging a front projection of the cleat. An inverted L-shaped rear clamping member is pivotably connected to the rear of the pedal for engaging a rear projection of the cleat, and a spring biases the rear clamping member forward toward the pedal body. The upper surface of the rear clamping member has a vertically inclined portion which cooperates with the cleat when the cleat is to be engaged with the pedal, and inner side surfaces of the rear clamping member have respective horizontally inclined portions which cooperate with the cleat when the cleat is to be disengaged from the pedal.

In operation, the rider inserts the front cleat projection into the horizontally-oriented U-shaped front clamping member and presses the rear cleat projection downward on the upper surface of the rear clamping member. The rear cleat projection presses against the vertically inclined portion of the upper surface of the rear clamping member, thus causing the rear clamping member to pivot away from the pedal body against the biasing force of the spring. After the rear cleat projection passes below the edge of the rear clamping member, the rear clamping member pivots forward toward the pedal body in accordance with the biasing force of the spring, thus engaging the rear cleat projection. As a result, the cleat now is firmly clamped by the front clamping member and rear clamping member. To disengage the cleat from the pedal, the rider rotates his or her foot around an axis perpendicular to the pedal surface. This causes the rear cleat projection to press against one of the horizontally inclined portions of the rear clamping member, thus causing the rear clamping member to pivot away from the pedal body against the biasing force of the spring. The cleat is released from the front and rear clamping members as soon as the rear projection passes by the lateral edge of the rear clamping member.

It is usually desirable to engage the cleat in the clamping mechanism quickly and to avoid inadvertent disengagement of the cleat from the clamping mechanism. The level of difficulty of engagement and disengagement of the cleat is determined by the biasing force of the spring connected to the pivoting rear clamping member. Thus, quick engagement is accomplished by using a spring having a small biasing force so that the rear clamping member moves easily when the rear cleat projection contacts the vertically inclined portion of the rear clamping member. On the other hand, prevention of inadvertent disengagement is accomplished by using a spring with a large biasing force, thus making it difficult to accidentally pivot the rear clamping member during vigorous riding. In a conventional bicycle pedal such as the pedal described above, there is only one biasing force for both engagement and disengagement of the cleat. Thus, the desired differences in engagement and disengagement forces cannot be accommodated.

SUMMARY OF THE INVENTION

The present invention is directed to a cleat clamping mechanism for a bicycle pedal wherein the force needed to engage the cleat with the clamping mechanism is different from the force needed to disengage the cleat from the clamping mechanism. In one embodiment of the present invention, the cleat clamping mechanism includes a base member, a first cleat clamping component movably coupled to the base member, and a second cleat clamping component coupled to the base member and spaced apart from the first cleat clamping component. The first cleat clamping component moves relative to the base member in response to a first force applied in a first direction, and the first cleat clamping component moves relative to the base member in response to a second force applied in a second direction that is different from the first direction. A resistance mechanism applies a particular resistive force to movement of the first cleat clamping component when the first cleat clamping component moves in response to the first force, but the resistance mechanism applies a different resistive force to movement of the first cleat clamping component when the first cleat clamping component moves in response to the second force.

In a more specific embodiment, the first cleat clamping component includes a first cleat clamping member for receiving the first force (which may be an engagement force) and a second cleat clamping member for receiving the second force (which may be a disengagement force). The first and second cleat clamping members are structured so that the first cleat clamping member moves relative to the second cleat clamping member when the first cleat clamping component moves in response to the engagement force, but the first cleat clamping member moves together with the second cleat clamping member when the first cleat clamping component moves in response to the disengagement force. The resistance mechanism may include a first resistance element and a second resistance element, wherein the first resistance element applies resistance to the first cleat clamping member when the first cleat clamping member pivots in response to the engagement force, and the second resistance element applies resistance to the second cleat clamping member when the second cleat clamping member pivots in response to the disengagement force. Since, in this embodiment, the first cleat clamping member pivots by itself in response to the engagement force, only the biasing force of the first resistance element resists movement of the first cleat clamping component when the cleat is to be engaged with the clamping mechanism. On the other hand, since the first and second cleat clamping members pivot together in response to the disengagement force, the biasing force of both the first and second resistance elements resist movement of the first cleat clamping component when the cleat is to be disengaged from the clamping mechanism. As a result, a relatively light force is needed to engage the cleat with the clamping mechanism, while a larger force is needed to disengage the cleat from the clamping mechanism.

DETAILED DESCRIPTION OF THE EMBODIMENTS

Figure 1:
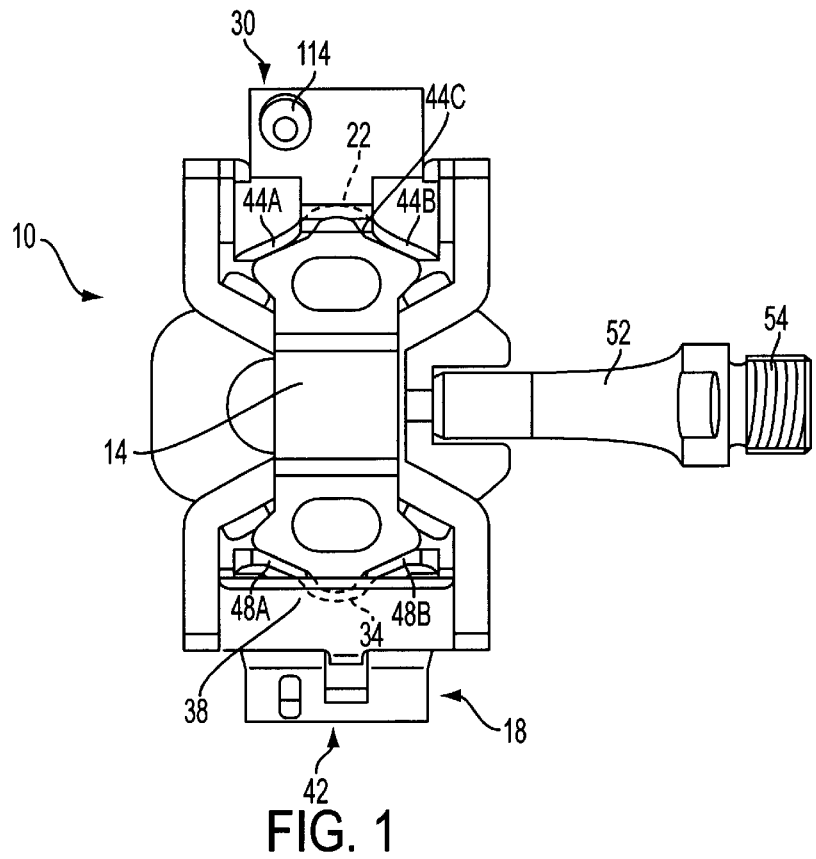
FIG. 1 is a top view of a particular embodiment of a bicycle pedal according to the present invention showing how a cleat is engaged in a particular embodiment of a cleat clamping mechanism according to the present invention.

FIG. 1 is a top view of a particular embodiment of a bicycle pedal 10 according to the present invention showing how a cleat 14 is engaged in a particular embodiment of a cleat clamping mechanism 18 according to the present invention. As shown in FIG. 1, a front projection 22 of cleat 14 is engaged below an intermediate member 44C of a front cleat clamping component 30, and a rear projection 34 of cleat 14 is engaged below a top wall 38 of a rear cleat clamping component 42. Cleat 14 is restrained from lateral movement by side members 44A and 44B of front cleat clamping component 30 and side members 48A and 48B of rear clamping component 42. How cleat 14 is engaged and disengaged from clamping mechanism 18 is described in more detail below.

Figure 2:
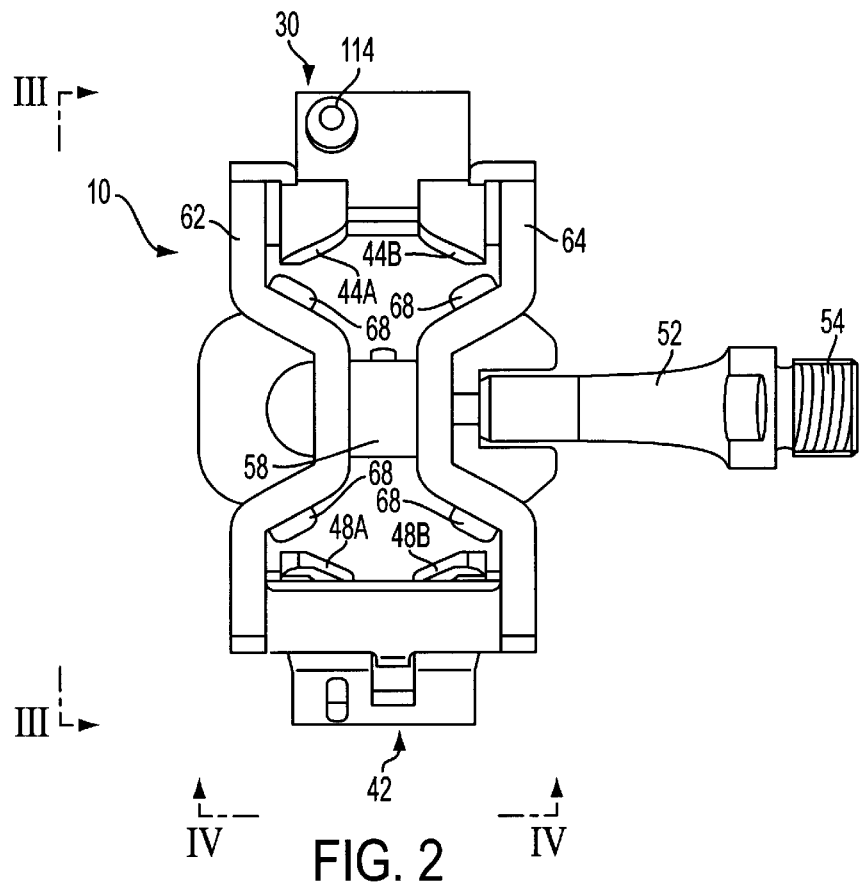
FIG. 2 is a top view of the pedal shown in FIG. 1 with the cleat removed.
Figure 3:
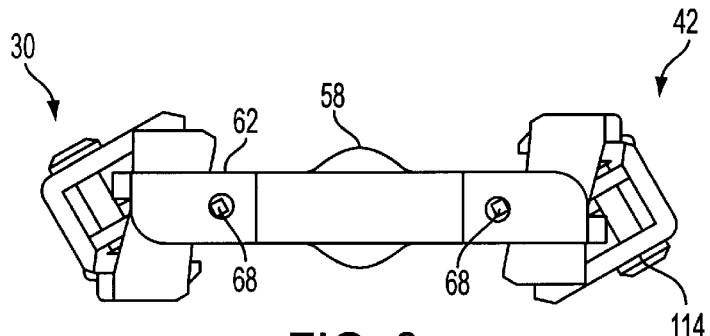
FIG. 3 is a side view of the pedal taken along line III—III in FIG. 2.
Figure 4:
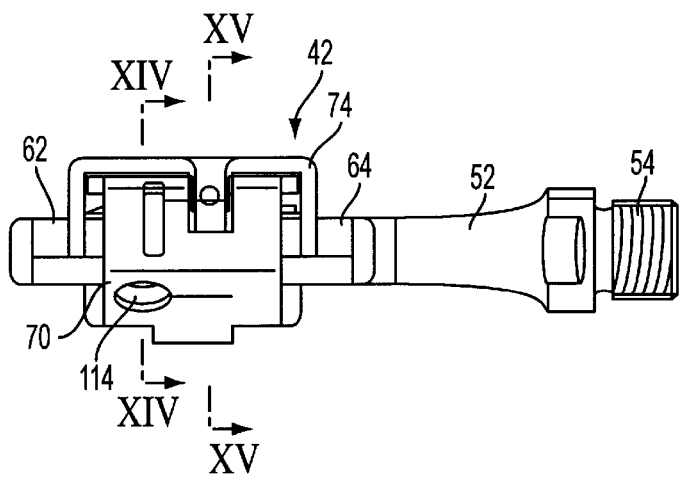
FIG. 4 is a rear view of the pedal taken along line IV—IV in FIG. 2.
Figure 5:
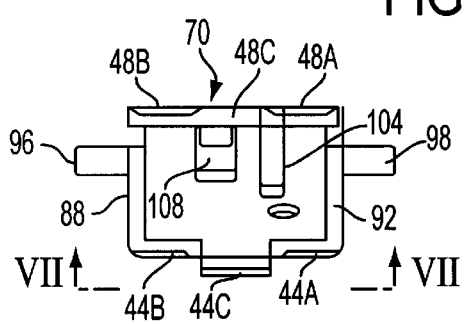
FIG. 5 is a front view of a particular embodiment of one of the cleat clamping members shown in FIG. 4.
Figure 6:
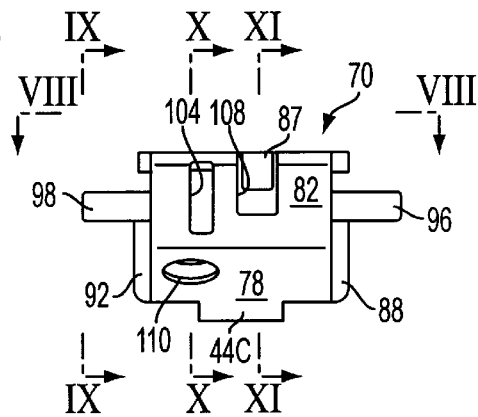
FIG. 6 is a rear view of the cleat clamping member shown in FIG. 5.
Figure 7:
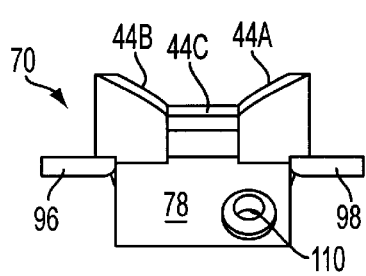
FIG. 7 is a view taken along line VII—VII in FIG. 5.
Figure 8:
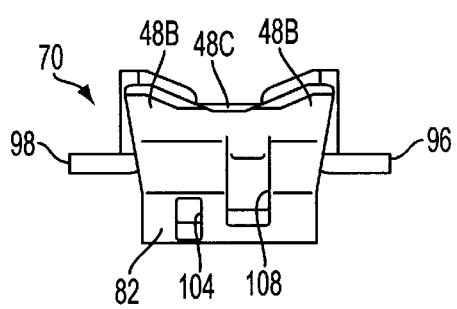
FIG. 8 is a view taken along line VIII—VIII in FIG. 6.
Figure 9:
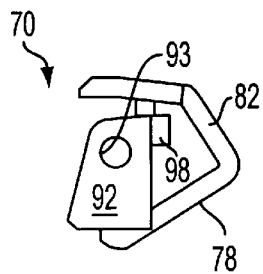
FIG. 9 is a view taken along line IX—IX in FIG. 6.
Figure 10:
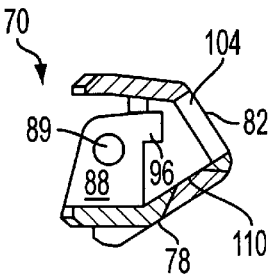
FIG. 10 is a view taken along line X—X in FIG. 6.
Figure 11:
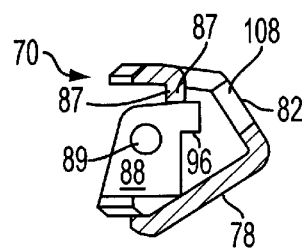
FIG. 11 is a view taken along line XI—XI in FIG. 6.

FIG. 2 is a top view of the pedal 10 without the cleat 14 attached, FIG. 3 is a side view of the pedal taken along line III—III in FIG. 2, and FIG. 4 is a rear view of the pedal taken along line IV—IV in FIG. 2. As shown in those Figures, pedal 10 includes an axle 52 having a threaded end 54 for screwing pedal 10 to a crank arm (not shown). A pedal body 58 is rotatably mounted around axle 52, and mounting beams 62 and 64 are fastened to pedal body 58 through screws 68. Mounting beams 62 and 64 serve as a base for mounting front cleat clamping component 30 and rear cleat clamping component 42.

In this embodiment, front cleat clamping component 30 and rear cleat clamping component 42 are constructed the same. However, as shown more clearly in FIG. 3, front cleat clamping component 30 is oriented 180° relative to rear cleat clamping component 42. The cleat clamping components 30 and 42 are structured so that, when pedal 10 is rotated 180°, rear cleat clamping component 42 serves as the front cleat clamping component, and front cleat clamping component 30 serves as the rear cleat clamping component. Thus, to simplify the explanation of the cleat clamping components, only rear cleat clamping component 42 will be described in detail.

As shown more clearly in FIG. 4, rear cleat clamping component 42 includes a cleat clamping member 70 and a cleat clamping member 74. As shown in FIGS. 5–11, cleat clamping member 70 includes a lower rear wall 78; an upper rear wall 82 inclined approximately 90° relative to lower rear wall 78; side walls 88 and 92 having respective openings 89 and 93 for receiving a pivot shaft (99, FIG. 16) therethrough; reinforcement pins 96 and 98 extending from side walls 88 and 92, respectively, for slidably contacting mounting beams 62 and 64; side members 48A, 48B and intermediate member 48C inclined relative to upper rear wall 82 so that side members 48A, 48B and intermediate member 48C are approximately parallel to mounting beams 62 and 64; side members 44A and 44B inclined relative to lower rear wall 78 so that side members 48A and 48B are approximately parallel to mounting beams 62 and 64; and intermediate member 48C. Slots 104 and 108 are provided in upper rear wall 82, and a threaded adjustment screw hole 110 for receiving a spring tension adjusting screw 114 (FIG. 14) therethrough is provided in lower rear wall 78 for reasons discussed below.

Figure 12:
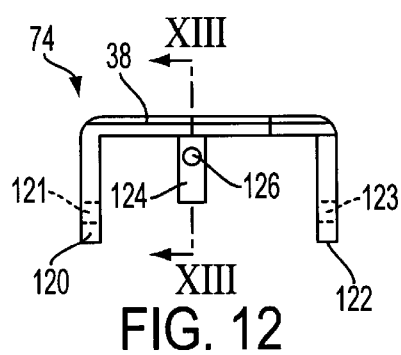
FIG. 12 is a front view of a particular embodiment of another one of the cleat clamping members shown in FIG. 4.
Figure 13:
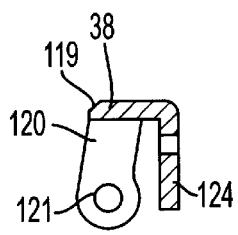
FIG. 13 is a view taken along line XIII—XIII in FIG. 12.

As shown in FIGS. 12 and 13, cleat clamping member 74 includes the top wall 38 having an inclined end surface 119, side walls 120 and 122 having respective openings 121 and 123 for receiving pivot shaft 99 therethrough, and a rear projection 124 extending downwardly from top wall 38. Rear projection 124 includes a threaded stopper screw hole 126 for receiving a stopper screw 128 (FIG. 15) therethrough.

Figure 14:
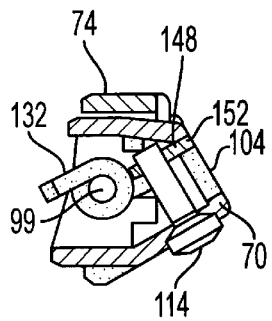
FIG. 14 is a view taken along line XIV—XIV in FIG. 4.
Figure 15:
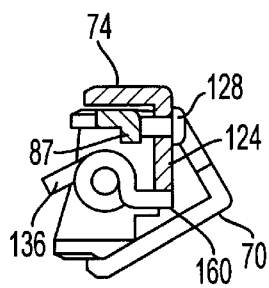
FIG. 15 is a view taken along line XV—XV in FIG. 4.
Figure 16:
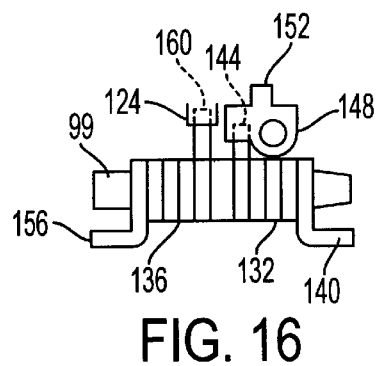
FIG. 16 is a view showing how two biasing springs cooperate with the two cleat clamping members shown in FIGS. 5 and 12.

FIGS. 14–16 show how cleat clamping members 70 and 74 are connected together for forming rear cleat clamping component 42. Cleat clamping members 70 and 74 are pivotably mounted around pivot shaft 99 by passing pivot shaft 99 through openings 89 and 93 in cleat clamping member 70 and through openings 121 and 123 in cleat clamping member 74. As shown more clearly in FIG. 4, cleat clamping member 74 is positioned around cleat clamping member 70. This structure allows cleat clamping member 74 to pivot relative to cleat clamping member 70.

Coil springs 132 and 136 are mounted around pivot shaft 99. One end 140 of coil spring 132 is fixed to mounting beam 62, and another end 144 of coil spring 132 abuts against a spring adjustment plate 148 that is screwed to spring tension adjusting screw 114. Spring adjustment plate 148 includes a guide tab 152 that slides within slot 104 in cleat clamping member 70. Spring 132 thus provides a biasing force to cleat clamping member 70 for biasing cleat clamping member 70 toward the pedal body 58 (counterclockwise in FIG. 14) for engaging the cleat 14. The biasing force of spring 132 can be adjusted by turning spring tension adjusting screw 114 to cause spring adjustment plate 148 to slide within slot 104, thereby changing the twist angle of spring end 144.

One end 156 of coil spring 136 is fixed to mounting beam 64, and another end 160 of coil spring 136 abuts against projection 124 of cleat clamping member 74. Spring 136 thus provides a biasing force to cleat clamping member 74 for biasing cleat clamping member 74 toward the pedal body 58 (counterclockwise in FIG. 15) for engaging cleat 14. Stop screw 128 abuts against an abutment 87 on cleat clamping member 70 to limit the counterclockwise rotation of cleat clamping member 74 relative to cleat clamping member 70. Stop screw 128 also ensures that clockwise rotation of cleat clamping member 70 will be transmitted to cleat clamping member 74.

Figure 17:
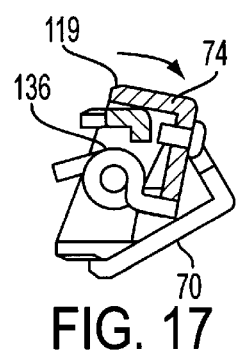
FIG. 17 is a cross sectional view showing how the cleat clamping members shown in FIGS. 14 an 15 pivot in response to a vertically applied force.
Figure 18:
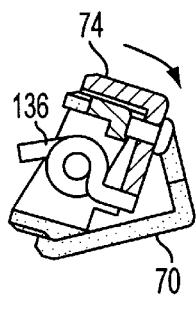
FIG. 18 is a cross sectional view showing how the cleat clamping members shown in FIGS. 14 and 15 pivot in response to a horizontally applied force.

The operation of rear cleat clamping component 42 can be understood by referring to FIGS. 17 and 18. After the cyclist inserts the front projection 22 of cleat 14 beneath intermediate portion 44C of front cleat clamping component 30, he or she presses the rear projection 34 of cleat 14 downwardly against top wall 38 of cleat clamping member 74. The bottom surface of cleat 14 (not shown) presses against the inclined surface 119 of top wall 38, thus causing cleat clamping member 74 to rotate clockwise in a cleat disengaging direction (e.g., clockwise) as shown by the arrow in FIG. 17 against the biasing force of spring 136. After the rear projection 34 of cleat 14 passes by the forward edge of top wall 38 of cleat clamping member 74, cleat clamping member 74 rotates counterclockwise to clamp the rear projection 34 of cleat 14 as shown in FIG. 1. As a result, lateral movement of front projection 22 of cleat 14 is prevented by side members 44A and 44B of cleat clamping member 70 of front cleat clamping component 30, upward movement of front projection 22 of cleat 14 is prevented by intermediate portion 44C of cleat clamping member 70 of front cleat clamping component 30, lateral movement of rear projection 34 of cleat 14 is prevented by side members 48A and 48B of cleat clamping member 70 of rear cleat clamping component 42, and upward movement of rear projection 34 of cleat 14 is prevented by the top wall 38 of cleat clamping member 74 of rear cleat clamping component 42.

When the cyclist wants to disengage cleat 14 from pedal 10, he or she rotates the foot around an axis perpendicular to the foot, which also corresponds to an axis perpendicular to pedal body 58. Rear cleat projection 34 then presses against side members 48A and 48B of cleat clamping member 70 of rear cleat clamping component 42. This, in turn, causes cleat clamping member 70 to rotate clockwise against the biasing force of spring 132 as shown in FIG. 18. Since abutment 87 presses against stop screw 128 fitted in projection 124 of cleat clamping member 74, cleat clamping member 74 rotates clockwise together with cleat clamping member 70 and against the biasing force of spring 136.

Thus, the cyclist must overcome the resistive force of both springs 132 and 136 when disengaging cleat 14 from pedal 10, whereas the cyclist must overcome only the resistive force of spring 132 when engaging the cleat 14 with pedal 10. As a result, cleat 14 may be engaged with pedal 10 very quickly, but inadvertent disengagement of cleat 14 from pedal 10 is prevented by the stronger biasing force of two springs.

While the above is a description of various embodiments of the present invention, further modifications may be employed without departing from the spirit and scope of the present invention. For example, the spring tension of springs 132 and 136 may be varied to further customize the engagement and disengagement forces required to operate the clamping mechanism. The size, shape, orientation, location and number of members making up each component may be changed as the application requires. Thus, the scope of the invention should not be limited by the specific structures disclosed. Instead, the true scope of the invention should be determined by the following claims.

What is claimed is:

1. A cleat clamping apparatus comprising:
    a base member;
    a first cleat clamping component movably coupled to the base member;
    wherein the first cleat clamping component moves relative to the base member in a cleat disengaging direction in response to a first force applied in a first direction;
    wherein the first cleat clamping component moves relative to the base member in the cleat disengaging direction in response to a second force applied in a second direction that is different from the first direction;
    a second cleat clamping component coupled to the base member and spaced apart from the first cleat clamping component;
    a resistance mechanism for applying a first resistive force to movement of the first cleat clamping component when the first cleat clamping component moves in response to the first force and for applying a different second resistive force to movement of the first cleat clamping component when the first cleat clamping component moves in response to the second force;
    wherein the resistance mechanism comprises a first resistance element and a second resistance element, wherein the first resistance element applies a first resistance to movement of the first cleat clamping component when the first cleat clamping component moves in response to the first force, and wherein the second resistance element applies a second resistance to movement of the first cleat clamping component when the first cleat clamping component moves in response to the second force;
    wherein the first cleat clamping component comprises:
        a first cleat clamping member for receiving the first force;
        a second cleat clamping member for receiving the second force; and
        wherein the first cleat clamping member has a first portion disposed in front of a second portion of the second cleat clamping member in the cleat disengaging direction so that the first cleat clamping member moves in the cleat disengaging direction in response to the first force and the second portion of the second cleat clamping member abuts against the first portion of the first cleat clamping member for moving the first cleat clamping member and second cleat clamping member together in the cleat disengaging direction in response to the second force.

2. The apparatus according to claim 1 wherein the first cleat clamping component moves in a same direction relative to the base member in response to both the first force and the second force.

3. The apparatus according to claim 1 wherein the first direction is substantially perpendicular to the second direction.

4. The apparatus according to claim 1 wherein both the first resistance and the second resistance are applied to movement of the first cleat clamping component when the first cleat clamping component moves in response to the second force.

5. The apparatus according to claim 4 wherein only the first resistance is applied to movement of the first cleat clamping component when the first cleat clamping component moves in response to the first force.

6. The apparatus according to claim 1 wherein the first resistance element comprises a first spring, and wherein the second resistance element comprises a second spring.

7. The apparatus according to claim 1 wherein the first direction is downward toward the base member, and wherein the second direction is lateral relative to the first direction.

8. The apparatus according to claim 1 wherein the first cleat clamping member moves relative to the second cleat clamping member when the first cleat clamping component moves in response to the first force.

9. The apparatus according to claim 8 wherein the first resistance element applies a first resistance to movement of the first cleat clamping member when the first cleat clamping component moves in response to the first force, and wherein the second resistance element applies a second resistance to movement of the second cleat clamping member when the first cleat clamping component moves in response to the second force.

10. The apparatus according to claim 9 wherein the first resistance element comprises a first spring, and wherein the second resistance element comprises a second spring.

11. The apparatus according to claim 1 wherein the first cleat clamping member pivots around a pivot axis, and wherein the first cleat clamping member includes a first cleat clamping member surface for receiving the first force.

12. The apparatus according to claim 11 wherein the second cleat clamping member pivots around the pivot axis, and wherein the second cleat clamping member includes a second cleat clamping member surface for receiving the second force.

13. The apparatus according to claim 12 wherein the first cleat clamping member pivots around the pivot axis relative to the second cleat clamping member when the first cleat clamping component moves in response to the first force.

14. The apparatus according to claim 13 wherein the first cleat clamping member pivots around the pivot axis together with the second cleat clamping member when the first cleat clamping component moves in response to the second force.

15. The apparatus according to claim 14 wherein the first direction is downward toward the base member, and wherein the second direction is lateral relative to the first direction.

16. The apparatus according to claim 15 wherein the first resistance element applies the first resistance to pivoting of the first cleat clamping member when the first cleat clamping member pivots in response to the first force, and wherein the second resistance element applies the second resistance to pivoting of the second cleat clamping member when the second cleat clamping member pivots in response to the second force.

17. The apparatus according to claim 16 wherein the first resistance element comprises a first spring, and wherein the second resistance element comprises a second spring.

18. The apparatus according to claim 17 wherein the first cleat clamping member surface is disposed above the second cleat clamping member.

* * * * *